United States Patent [19]

Lebizay et al.

[11] Patent Number: 4,706,150
[45] Date of Patent: Nov. 10, 1987

[54] SWITCHING PROTOCAL FOR MULTIPLE AUTONOMOUS SWITCHING PLANES

[75] Inventors: Gerald Lebizay, White Plains; Yeong-Chang L. Lien, Briarcliff Manor; Philip S. Yu, Pleasantville, all of N.Y.

[73] Assignee: International Business Machines Corporation, Armonk, N.Y.

[21] Appl. No.: 933,309

[22] Filed: Nov. 21, 1986

Related U.S. Application Data

[63] Continuation of Ser. No. 626,511, Jun. 29, 1984, abandoned.

[51] Int. Cl.⁴ .................... H04Q 11/00; H04Q 5/00; H04M 3/00
[52] U.S. Cl. ............................ 340/825.5; 340/825.8; 379/272
[58] Field of Search ........... 340/825.03, 825.5, 825.51, 340/825.79, 825.8, 825.89; 375/36, 38; 370/16, 29, 64; 379/272, 273

[56] References Cited

U.S. PATENT DOCUMENTS

| | | | |
|---|---|---|---|
| 4,015,204 | 3/1977 | Miyazawa | 375/38 |
| 4,366,480 | 12/1982 | Van Hatten | 340/825.51 |
| 4,400,627 | 8/1983 | Zola | 340/825.8 |
| 4,409,592 | 10/1983 | Hunt | 340/825.5 |
| 4,412,322 | 0/0000 | Briley et al. | |
| 4,417,245 | 11/1983 | Melas et al. | 179/18 GF |
| 4,531,238 | 7/1985 | Rawson et al. | 340/825.5 |

FOREIGN PATENT DOCUMENTS 0141233 of 0000 European Pat. Off. .

OTHER PUBLICATIONS

"VLSI Based Interconnection Networks", 1981 IEEE International Symposium on Circuits and Systems Proceedings, pp. 243-247, Chicago, Ill., Apr. 1981, M. A. Franklin, et al.

*Primary Examiner*—John W. Caldwell, Sr.
*Assistant Examiner*—Ralph E. Smith
*Attorney, Agent, or Firm*—Sughrue, Mion, Zinn, Macpeak, and Seas

[57] ABSTRACT

A protocol for a switching system that establishes multiple parallel paths between users through multiple autonomous switching planes by having a user desiring connection to issue connection requests to each of the switching planes. According to the invention, the user monitors the number of connections that have been successfully completed and if only some of the connections have been completed, because of conflicting requests, it follows a conflict protocol to issue retry requests to the planes on which the connection request was unsuccessful. Each switching plane follows the conflict protocol to respond to the retry request by disconnecting existing connections and completing at most one retried connection request.

13 Claims, 12 Drawing Figures

SWITCH PLANE DATA FLOW

CONFLICT RESOLUTION
SCHEME 1

CONFLICT RESOLUTION
SCHEME 2

CONFLICT RESOLUTION
SCHEME 3

SWITCHING PROTOCAL FOR MULTIPLE AUTONOMOUS SWITCHING PLANES

This is a continuation of application Ser. No. 626,511 filed June 29, 1984, now abandoned.

DESCRIPTION

1. Field of the Invention

The invention relates generally to switching systems. In particular, it relates to a protocol for a switching system of multiple, autonomous planes of cross-point switches.

2. Background of the Invention

One of the present inventors has filed a copending U.S. patent application on 6/27/84. Ser. No. 06/624,881, entitled "Cross-point Switch of Multiple Autonomous Planes", incorporated herein by reference. That patent application discloses a switching system, illustrated in FIG. 1, for selectively providing point-to-point communication paths between users 10 and 12, two of which are illustrated in FIG. 1. An adaptor 14 is associated with each user 10 and is connected to it by an internal memory bus 16. The adaptor 14 divides a message on the internal memory bus 16 into a number of parallel paths. Each path is defined by an output line 18, 20 and 22. Each output line is associated with a parallel input line 24, 26 and 28 to form pairs of full-duplex lines. Each pair of input and output lines 18 and 24, 20 and 26 or 22 and 28 is connected to a different cross-point switch 30, 32 and 34 in a central switch 36. Only three sets of full-duplex lines and three cross-point switches are shown in FIG. 1 but any number equal to or greater than two is possible with the invention. In a further embodiment of the invention, there may be a greater number g of full-duplex lines between the adaptor 14 and the individual switches 30, 32 and 34.

The remaining users such as user 12 have a similar adaptor and similar full-duplex lines to the individual cross-point switches. Each adaptor 14 not only can divide a message from the internal memory bus 16 onto the parallel output lines 18, 20 and 22 but can also recombine messages that it receives on parallel input lines 24, 26 and 28 into a recombined message on the internal memory bus 16.

If a user 10 wishes to communicate with another user 12, its adaptor 14 simultaneously instructs all the cross-point switches 30, 32 and 34 to make the proper connections to the input and output lines of the adaptor of the other user 12. Thereby, parallel communication paths are established between the two users 10 and 12. The total bandwidth of the parallel communication path is thus not limited to the bandwidth of a single duplex line or of a single cross-point switch. Instead, the limiting bandwidth of the duplex line 10 and 24 or of the cross-point switch 30 is multiplied by the number of parallel paths.

A roughly analogous communication system is described in U.S. Pat. No. 4,015,204 to Miyazawa in which data are switched into parallel registers which are then used to modulate different carrier frequencies on a single transmission line. Wide band switching is itself a known idea, as discussed by Teraslinna in U.S. Pat. No. 4,402,008. Parallel planes of circuits for either storage or switching have been described by Mansuetto et al in U.S. Pat. No. 3,321,745 and by Burns in U.S. Pat. No. 3,355,721.

One of the functions of each adaptor 14 is to issue controls to each of the cross-point switches 30, 32 and 34 to make the proper connections and disconnections. These commands are carried on the same output lines 18, 20 and 22 that are used for the subsequently transmitted parallel message. The previously described patent application discloses a fast and efficient protocol for the connection and disconnection commands. The protocol must be followed for all the cross-point switches 30, 32 and 34 in the central switch 36 that are being used for the parallel communication paths. It is assumed that the cross-point switches 30, 32 and 34 are independent of each other so that a command issued to one cross-point switch has no effect upon the other cross-point switches in the central switch 36.

Thus is there are n cross-point switches 30, 32 and 34 setting up the parallel paths, n simultaneous commands for connection must be issued by the requesting adaptor 14. It has previously been assumed that all n requests would either be all successful or all unsuccessful. An unsuccessful request would result when the user to which the connection is requested is already busy, that is, its input and output lines are already connected to still another user. However, the switching system of FIG. 1 is intended to be operated at very high switching rates and the simultaneity of parallel commands issuing from a single adaptor is no guarantee that the commands will be simultaneously received at all the cross-point switches 30, 32 and 34. A fairly large amount of time skew between the various parallel paths is anticipated for the described invention so that the connections on the various planes of the central switch 36 are likely to be performed at slightly varying times depending upon the delays introduced by separate output lines and the control circuitry within the individual cross-point switches. Furthermore, there is no master clock but instead different clocks control the switching functions on each plane. As a result, if two users are simultaneously attempting to make a connection to a single third user, there is a probability that some connections will be made for the first user and some for the second user. Neither user would have established a complete set of parallel connection with the desired destination user.

The switching system of the above-mentioned U.S. patent application Ser. No. 624,881 will now be described in detail with reference to FIGS. 2 to 7. As illustrated in FIG. 2, the switching system includes a central switch 130 comprising multiple planes of independent cross-point switches 132. The number of cross-point switches 132 or planes is n, which is preferably a positive power of 2, e.g. 2, 4, 8, etc. The value of n is one parameter determining the bandwidth of the switch and may be a very large number. Each cross-point switch 132 is an m×m matrix of cross-points with m ports. The preferred structure of the cross-point switch 132 will be described later.

There are a number U of users 134. Each user 134 comprises a processor 110 with a fast cache memory 112 and a larger but slower local memory 114. For high speed multi-processor systems, the number U of processors 110 can be a large number such as 256. One or more processors 110 are assumed to be dedicated to supporting these shared memories and the input/output functions. A storage control element 136 is attached to each user and controls the flow of data between the processor 110 and the local memory 114, as well as the data flow external to the user. Each user 134 also has a user adaptor 138 linked to the storage control element 136 of that user by an internal memory bus 140. The internal memory bus 140 is B bytes wide, that is, B sets of 8 parallel serial lines since there are 8 bits per byte. The adaptor 138 of each user 134 is linked to the n cross-point switches 132 by N serial links 142 with at least one serial link 142 to each cross-point switch 132. At this point in the discussion, two simplifying assumptions will be made. First of all, it will be assumed that only one serial link 142 connects any user adaptor 138 to a particular cross-point switch 132. As a result, $n=N$ and $m=U$. The second assumption is that the width 8B of the internal memory bus 140 is equal to the number of serial links 142, that is, $8B=N$. In the general case, neither of these simplifying assumptions need be true.

The separate planes 132 of the central switch 130 are controlled in their switching by the user adaptors 138 over the serial links 142. As a result, the planes 132 are independent of each other and the only coordination between planes is performed by the user adaptors 138 which issue connection and disconnection commands to the separate cross-point switches 132. When a storage control element 136, under the control of its processor 110, wishes to send or receive data from another user 134, the adaptor 138 of that user 134 issues nearly simultaneous commands to all the planes 132 to make the proper connection on each plane 132. If the connections are properly made, N serial links passing through the n planes 132 of the central switch 130 connect the two user adaptors 138 of the two users 134. Once the connections are made, the total bandwidth of the link is N times the bandwidth of the serial links 142 and of the separate cross-pont switches 132.

The bandwidth of the central switch 130 can be increased by increasing the number n of planes 132 within the switch. Because of the modular nature of the central switch 130, this increase in bandwidth can be performed upon an existing system by adding more planes 132. The previously existing planes 132 need no modification in the enhanced switch 130. Of course, the user adaptor 138 would need to be modified to accommodate the increase in the number N of serial links 142.

In another embodiment, illustrated in FIG. 3, more than one serial link 142 links each user adaptor 138 to each plane 132 in the central switch 130. This condition violates the previous simplification that $N=n$. Let the number of serial links 142 between each adaptor 138 and each plane 132 be the number g. In the simplified case, $g=1$. However, g can be assigned a higher value, preferably a power of 2, such as 2, 4, 8, etc. The higher values of g allow for a high bandwidth central switch without a corresponding increase in the number of planes 132. The number n of planes 132 is related to the number N of serial links 142 by the relation $ng=N$. If there are a number U of adaptors 138, or equivalently of users 134 or of processors 110, $U=m/g$, where m is the number of ports upon each of the cross-point switches 132. Of course, higher values of g will either reduce the number U of users that the central switch 130 can service, or alternatively requires an increase in the size m of the $m \times m$ cross-point switching matrix in each plane 132. For a fixed bandwidth and a given number U of users, g, m and n can be selected with the above relations kept in mind to produce the most cost effective central switch 130.

The user adaptor 138 will now be described in more detail, with reference to FIG. 4. In the simplest case, the user adaptor 138 connects N serial links 142 to an internal memory bus 140 also having N parallel lines. However, as previously mentioned, the number of serial links 142 can be increased to $N+M$ to allow for M spare planes in the central switch 130. In general, the number of lines in the internal memory bus 140 is equal to a number 8B which is chosen based upon the technology of the processor 110 and the storage control element 136 rather than for the central switch 130. This generalization violates the second previous simplifying assumption. For present day thermal conduction modules, internal memory buses 140 are conveniently in the range of 32 to 64 bytes wide, i.e., $B=32$ or 64. While the serial links 142 are likely to be implemented in very high speed fiber optics, the internal memory bus 140 will likely continue to be fairly conventional electrical paths. Accordingly, the bus width 8B is likely to increase far beyond the number N of serial links 142. On the other hand, it is conceivable that fairly low speed serial links 142 could be used which would have a lower individual bandwidth than the individual lines of the internal data bus 140.

The data flow through the multiple planes 132 of the central switch 130 is performed independently over the N serial links 142. Whatever clocking is required is provided by the user adaptors 138. As a result of the independent flow and the very high data rates which are envisioned, it is likely that the parallel data flow will become desynchronized as it proceeds through the central switch 130. That is, parallel data which were synchronized at the transmitting user adaptor 138 arrive at the receiving user adaptor 138 at an indeterminate phase with respect to each other. Furthermore, a modular design may dictate that an adaptor 138 have separate clocks for each of the serial links 142 so that even synchronization at the sending end cannot be assumed. Accordingly, it may be necessary to provide a resynchronization circuit in the user adaptor 138 in order to allow for synchronized parallel data flow in the internal data bus 140. An example of a resynchronization circuit is illustrated in FIG. 5.

Possibly desynchronized data is received on the serial links 142 and separately decoded in decoders 144 to convert the transmitted data into a format by the user device. The form of the coding will be described later. The decoders 144 output to first-in, first-out buffers 146 only valid data. Each buffer 146 has an output indicating that the paricular buffer 146 contains at least one bit of data. These outputs are combined in an AND gate 148. The AND gate 148 outputs a true signal when all the buffers 146 contain valid data and this output triggers an enable circuit 150 which passes an output clock signal from a clock 152 in the user adaptor 138. The output clock signal is simultaneously fed to all the buffers to clock out the buffered data onto the individual lines of the internal memory bus 140. The enable circuit 150 is preferably designed to enable the clocking of one serial byte of information per trigger from the AND gate 148. Subsequent bytes read into the parallel buffers 146 need to reenable the output clock signal. The byte-by-byte resynchronization is required by the fact that the clock 152 of the receiving adaptor is operating independently of the clock of the transmitting adaptor so that the relative phase of the two clocks may drift.

A more detailed description will now be presented for the structure of the cross-point switches 132. A simplified schematic diagram of a single plane for cross-point switch 132 is illustrated in FIG. 6 for an $m \times m$ cross-point switching matrix. There are m serial input links 160 and m serial output links 162. In the general case, each of the input links 160 is connected to a different user adaptor 138 for a completely independent data path. If g is greater than 1, 2 or more of the input links 160 are connected to the same user adaptor 138. Each input link 160 is connected to its own receiver in a receiver section 164. Likewise, each of the m serial outputs 162 is connected to a separate user adaptor 138 in the case when g is equal to 1. Each of the output links 162 is driven by its own driver in a driver section 166. The outputs of the receiver section 164 are separately connected to m horizontal lines in a cross-point switching matrix 168. For instance, the i-th output is connected to the i-th horizontal line 170. Similarly, the m inputs of the driver section 166 are connected to m vertical lines in the switching matrix 168. For instance the j-th input is connected to the j-th vertical line 172.

At every one of the m×m intersections of the horizontal and vertical lines is an individually selectable cross-point, such as the cross-point 174 between the i-th horizontal line 170 and the j-th vertical line 172. The cross-point 174 comprises a gate 176 which is turned on and off by another control gate 178. The control gate 178 is acting as an AND gate that is controlled by row control line 180 associated with the horizontal line 170 and by a column control linen 182 that is associated with the vertical line 72. When the row and column control lines 180 and 182 are concurrently selected, the cross-point at their intersection is selected. Now shown in FIG. 6 is the latching circuitry that enables the latching of the cross-point 174 by the one time application of control signals on the row and column control lines 180 and 182. Examples of such latching cross-point switching matrices is provided in the U.S. patent application Ser. No. 544,652 filed on Oct. 24, 1983, by C. J. Georgiou and entitled "Fault-tolerant Array of Cross-point Switching Matrices".

It is assumed that the individual cross points 174 are set by control information transmitted on the same input links 160 that are being connected onto the cross-point matrix 168. A controller 184 is used to receive this control information and to control the row and column control lines 180 and 182 over a row control bus 186 and a column control bus 188. Such a controller is described in another C. J. Georgiou, U.S. patent application Ser. No. 544,653, filed Oct. 24, 1983. The controller 184, in very simple terms, consists of a decoder section 190 of separate decoders attached to each of the outputs of the receiver section 164. The individual decoders decode the data on individual lines and determine if the data contain control information for setting up the switching matrix 168. A selector 192 uses this control information to select the setting of the individual cross-points 174 based upon connections status information contained in an m×1 array 194. A marker 196 performs the actual setting of the cross-points 174.

A service adaptor 196 can also be provided to allow diagnostic inspection of the switching matrix 168 and the controller 184, as directed by service instructions inputted on the input links 160. The driver section 166 may additionally be provided with carrier detectors on individual drivers to assure that connected cross-points 174 are continuing to satisfactorily transmit the data modulated carrier. The driver section 166 is then connected to a checking circuit 198 in the controller 184 by a carrier detector bus 100. The checking circuit 198 recognizes abnormal data transmission and can initiate a diganostic routine in the service adaptor 196.

The function of the switching matrix 168 is to selectively connect any one of the m input links 160 to any one of the m outputs links 162. This is a one-to-one connection with each input link 160 being connected to at most one output link 162 at any one time, and vice versa. However, m independent paths can be connected through the switching matrix 168 simultaneously. The above description of the switching matrix 168 describes a two-sided switching matrix with separate input links 160 and output links 162. However, in the previously cited U.S. patent application Ser. No. 544,652, Georgiou describes a one-sided switching matrix in which the external connections to the switching system can be either input or output lines. That is, the serial links 142 would be half-duplex. By half-duplex is meant that the serial links connected to the switching system can at different time can be either input lines or output lines. Such a one-sided switching matrix can advantageously be applied to this invention. In that application, Georgiou also describes how the switching matrix 168 can comprise a matrix of switching chips on a single plane. Whether the switching matrix 168 is a single integrated circuit chip, a matrix of chips or other configurations is not crucial. In yet another U.S. patent application Ser. No. 599,874, filed Apr. 13, 1984, and entitled "Full-duplex One-Sided Cross-point Switch", Georgiou describes a full-duplex cross-point switching matrix in which two communications paths are always paired through the cross-point switch to allow for simultaneous bi-directional communication. As will be described later, a full-duplex switching system can be advantageously applied for a simple switching protocol.

A possible switching protocol that can be used with the above-discussed system will now be described. The protocol assumes several limitations upon the structure of the central switch and the serial links 142. First of all, it is assumed that all data transfer is accomplished by a request/response sequence, that is, that one user requests another user to respond. Prior to the request, there is no connection between the user, and, after the response, the connection is broken. It is further assumed that each adaptor has two serial links to each of the switching planes, one for transmitting and one for receiving. These two links can be considered as a full-duplex link. It is further assumed that the adaptors are continuously broadcasting and receiving at some fixed repetition rate. This continuous broadcasting is illustrated in FIG. 7 for two users A and B connected through the switch of the invention. If user A is not otherwise connected through the switch, the switch connects the input from user A to the output back to user A. Similarly, the output from user B is connected to its own input if the two serial links are not otherwise used. In the idle mode, as illustrated in FIG. 7, both user A and user B are periodically transmitting a characteristic control word $C_1$ followed by the identification of the transmitting user. Because the switch reflects these signals back to the transmitting user, after a propagation time, both use A and user B receive their own idle transmissions. This continuous test sequence tests 99% of the electro-optic path and serves other purposes to be described later.

If user A wishes to transmit a request to user B, user A transmits first an 8 byte connect frame followed by a 6 byte data frame. The connect frame consists of the first byte $C_2$ is followed by the identification B of the requested destination user. The connect frame finishes up with a clock synchronization sequence and then idle characters. Following the connect frame is the data frame containing data which is delimited at both beginning and the end by delimiting characters $C_3$. The data in the data frame provides the information for the receiving user B to respond to.

The previously mentioned Georgiou patent application Ser. No. 544,653, describes a very fast, pipelined marking and unmarking procedure. It is believed that if the connection through the switch is available, it can be accomplished in 50 ns, allowing the following data frame to be transmitted through the switch to the receiving user B. If however the connection cannot be made, for example, because user B is busy, no change in connection is made and the transmitting user A receives back its own connect and data frames. If the connection is successfully made, the transmitting user A receives instead the idle transmission $C_1B$ of the station to which it is transmitting, thus confirming the connection.

One the receiving user B has received the request, it must spend some time processing this request. During the processing time, user B continues to broadcast its idle code $C_1B$ which is received by the originally requesting user A. This user A is in a wait state awaiting the response is also continuing to transmit its idle sequence of $C_1A$ which is transmitted to the other user B.

Once the user B has had sufficient time to process the request for data, it proceeds to transmit the data delimited on the forward end by a delimiter $C_3$ and delimited on the trailing by the control character $C_2$. Although the control character $C_2$ was previously used as a connect control character it also indicates to an already connected cross-point that the cross-point is to be disconnected. The data is transmitted in the delimited packet and may be of substantial length, for instance 132 bytes if a page of data is being transferred over 32 channels. On the other hand, the data packet may be short if only a short response message is requested, in which case only a single channel may suffice. This data is the response to the original request and is received by the requesting user A. During the time of the data transmission, the user A continues to broadcast its idle sequence $C_1A$. It is seen that, although a full-duplex serial link is used for setting the connection, once the connection is made the serial link needs only be half-duplex since data is being transmitted only in one direction at any time.

After the data packet has passed through the switch, the cross-point connecting user A to user B is disconnected. The user B then recommences sending its idle sequence $C_1B$ which is reflected back to user B by the switch. The user A, which has continued to transmit its idle sequence $C_1A$ during the data reception, sends out a disconnect control character $C_2$ to insure the disconnection of the switch. When the user A begins to receive its own idle code $C_1A$, it has confirmed that this disconnection of the cross-point at the switch.

It should be noted that there are two types of disconnections. A disconnection of the cross-point severs the two connected users. However, the users may be still connected to their respective ports on the cross-point switches. Thus when the destination user B sends its disconnect control character $C_2$, the cross-point is disconnected and the port from user B to the switch is also disconnected. However, the source user A remains connected to the switch. This prolonged connection is useful in that it provides the user A time to process the data transmitted to it without the possibility of another user causing a connection for a request for which user A is not yet ready. Thus when the source user A sends its disconnect control character $C_2$ to the switch, it disconnects itself from the switch and indicates that it is ready for further messages.

SUMMARY OF THE INVENTION

Accordingly, it is an object of this invention to provide a method for establishing parallel connections in multiple cross-point switches between two users.

It is a further object of this invention to provide a method of resolving a conflict when two or more users attempt to make conflicting connections to another user.

The invention can be summarized as a protocol for accomplishing simultaneous connections through a plurality of autonomous switching planes. A user issues a connection command to all of the planes. The user is notified by each of the planes if a connection has been successfully made. If all the connections have not been made, the user issues a retry request to resolve the conflict with other users that have attempted to make conflicting connections. The retry request may be of three separate forms. The user that has established a connection is a particular plane can issue a retry request that overrides already established connections in the remaining planes. In another form, the user that has established connections through a majority of the planes issues a retry request that likewise overrides the connections already established in the remaining planes. In a third form, all users issue retry requests. The switching planes receive the retry request and according to a priority scheme among the users accept a higher priority retry request than the conflicting connection and rejects a lower priority one.

DETAILED DESCRIPTION OF THE PREFERRED EMBODIMENTS

In the present invention, the user establishes simultaneous communication paths through the multiple autonomous switching planes by the use of three commands CONNECT, DISCONNECT and RETRY. The first two of these, CONNECT and DISCONNECT are described in the co-pending and previously cited patent application. That explanation is repeated here because of their integral relationship with the new command RETRY.

Figure 10:
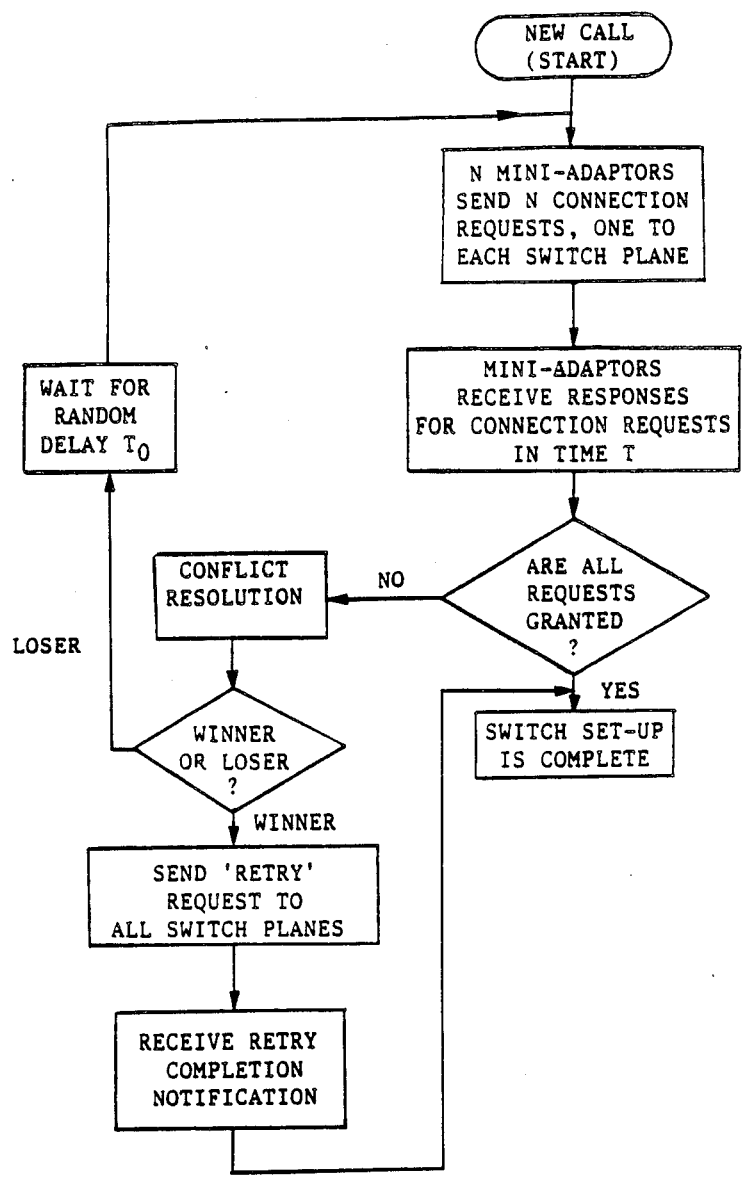
FIG. 10 is a flowchart showing operations of the switching system of the invention.

The operations of the switching method of the invention are summarized in the flowchart of FIG. 10 and are considered in detail in the discussion below.

Figure 1:
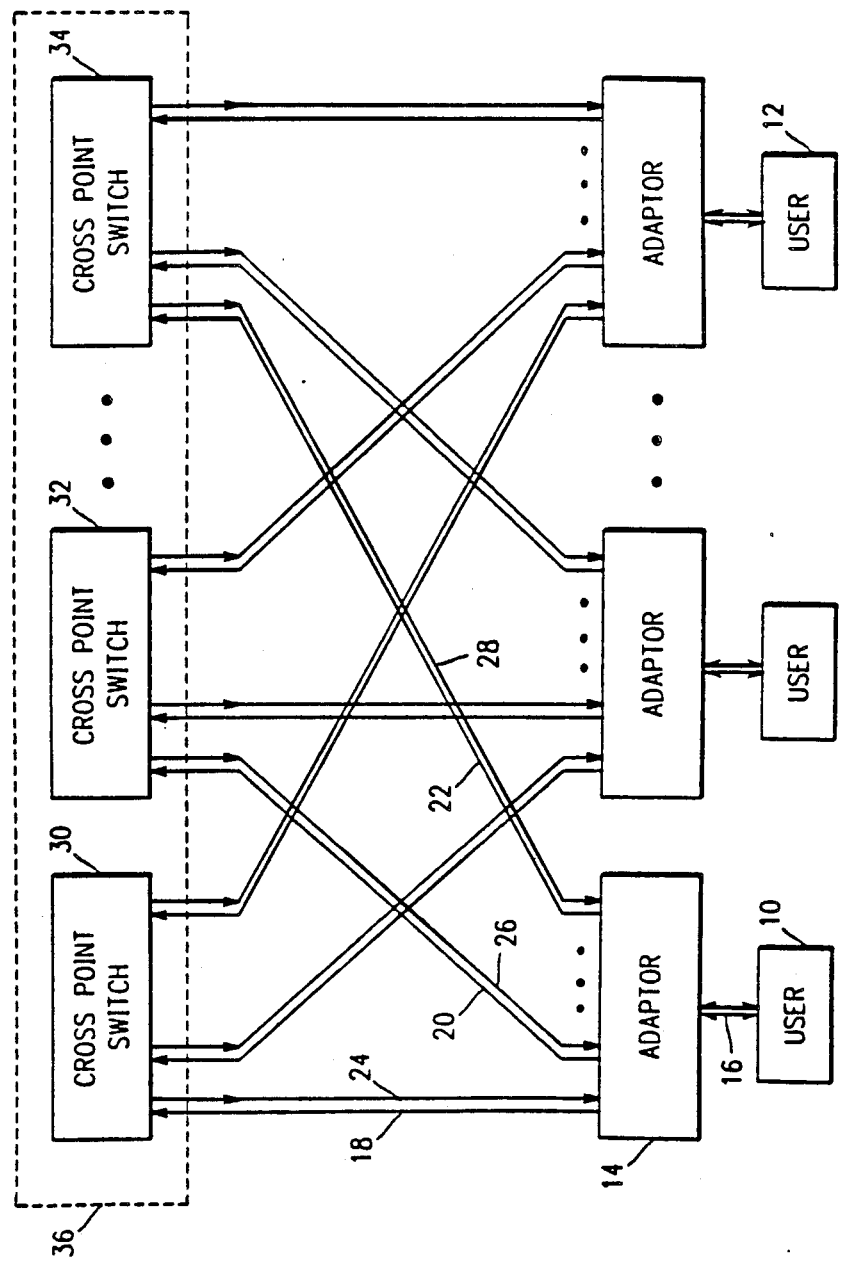
FIG. 1 is a block diagram of the multi-plane switching system usable with the present invention.
Figure 2:
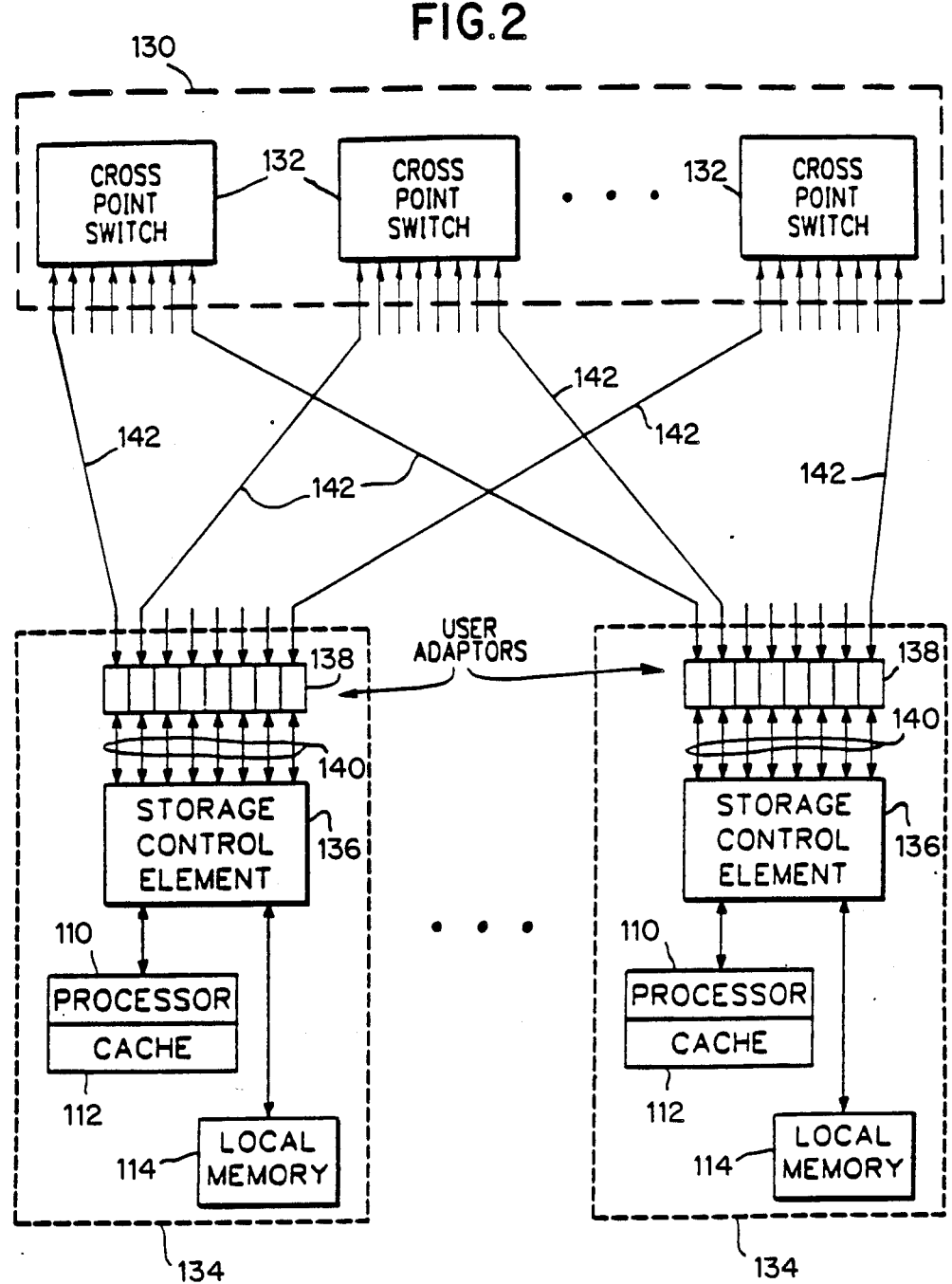
FIG. 2 is a block diagram of a multi-processor system using a multi-plane cross-point switch.
Figure 3:
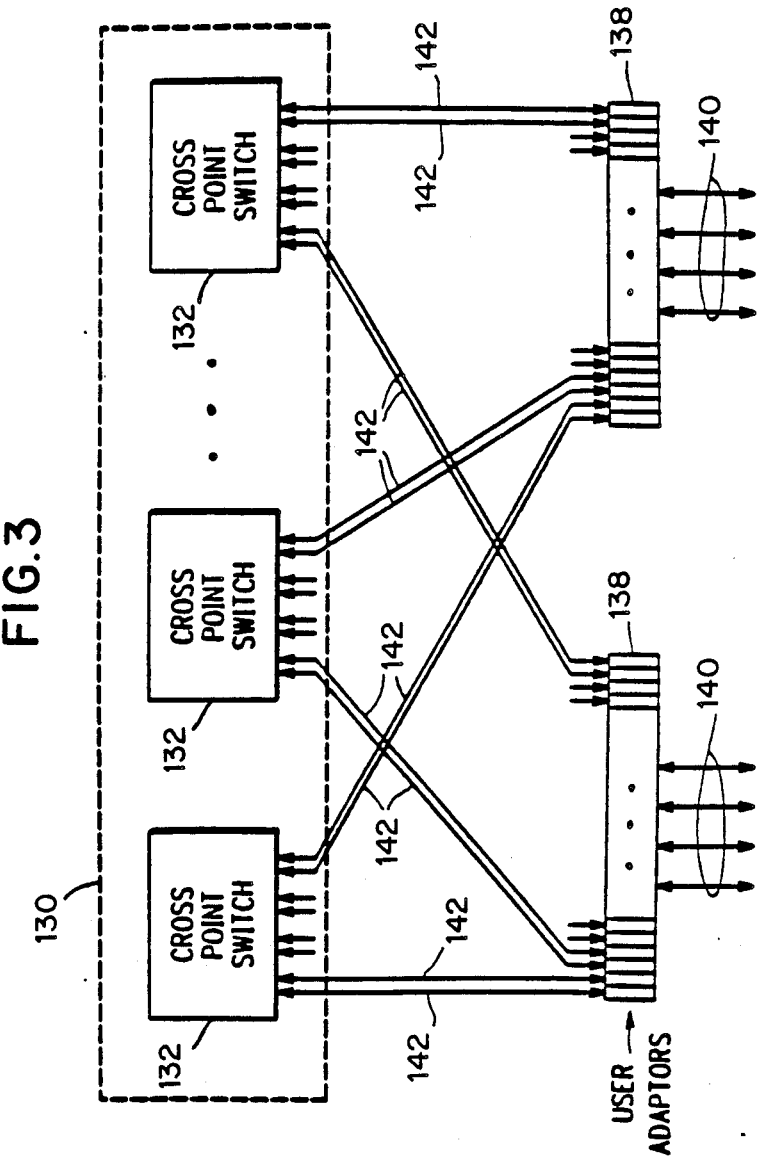
FIG. 3 is a block diagram of another embodiment of a cross-point switch.
Figure 4:
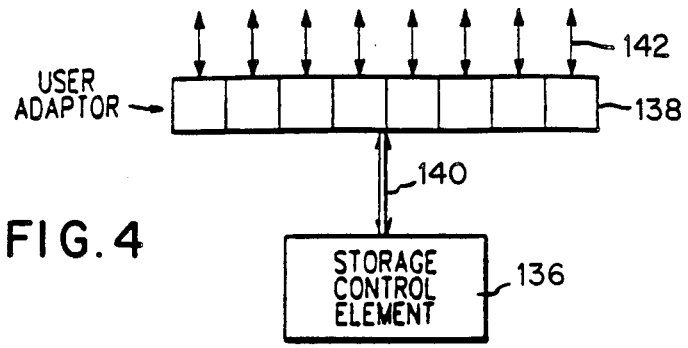
FIG. 4 is a block diagram of a user adaptor employed in the above multi-processor system.
Figure 5:
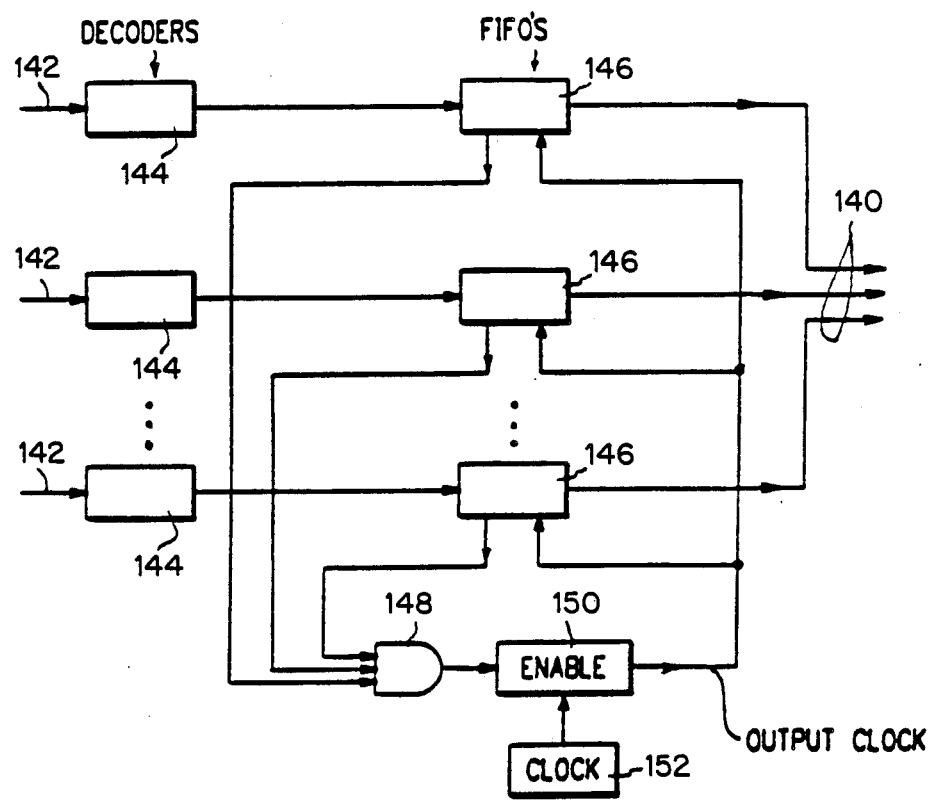
FIG. 5 is a block diagram of a resynchronization circuit.
Figure 6:
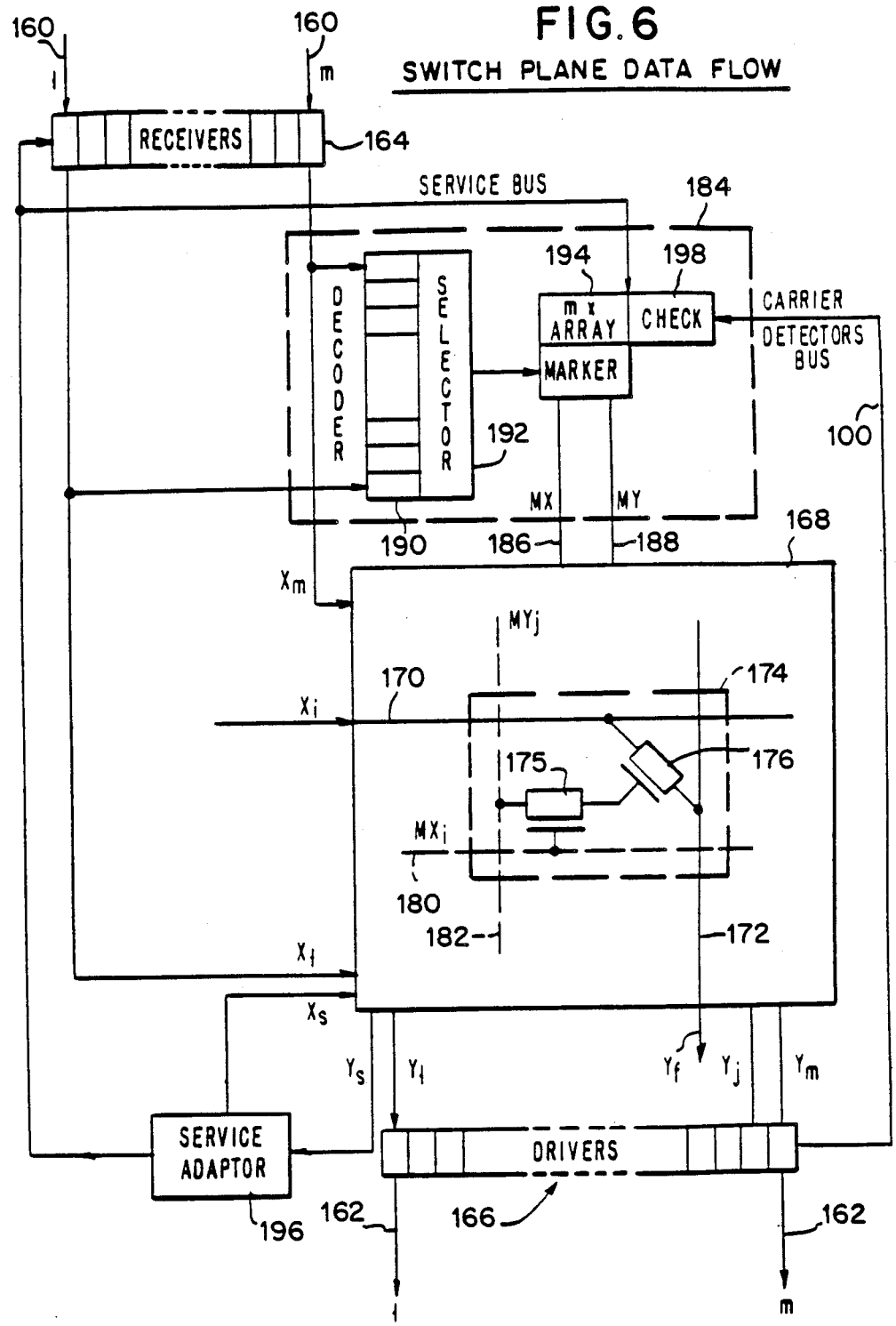
FIG. 6 is a block diagram of one plane of a cross-point switch.
Figure 7:
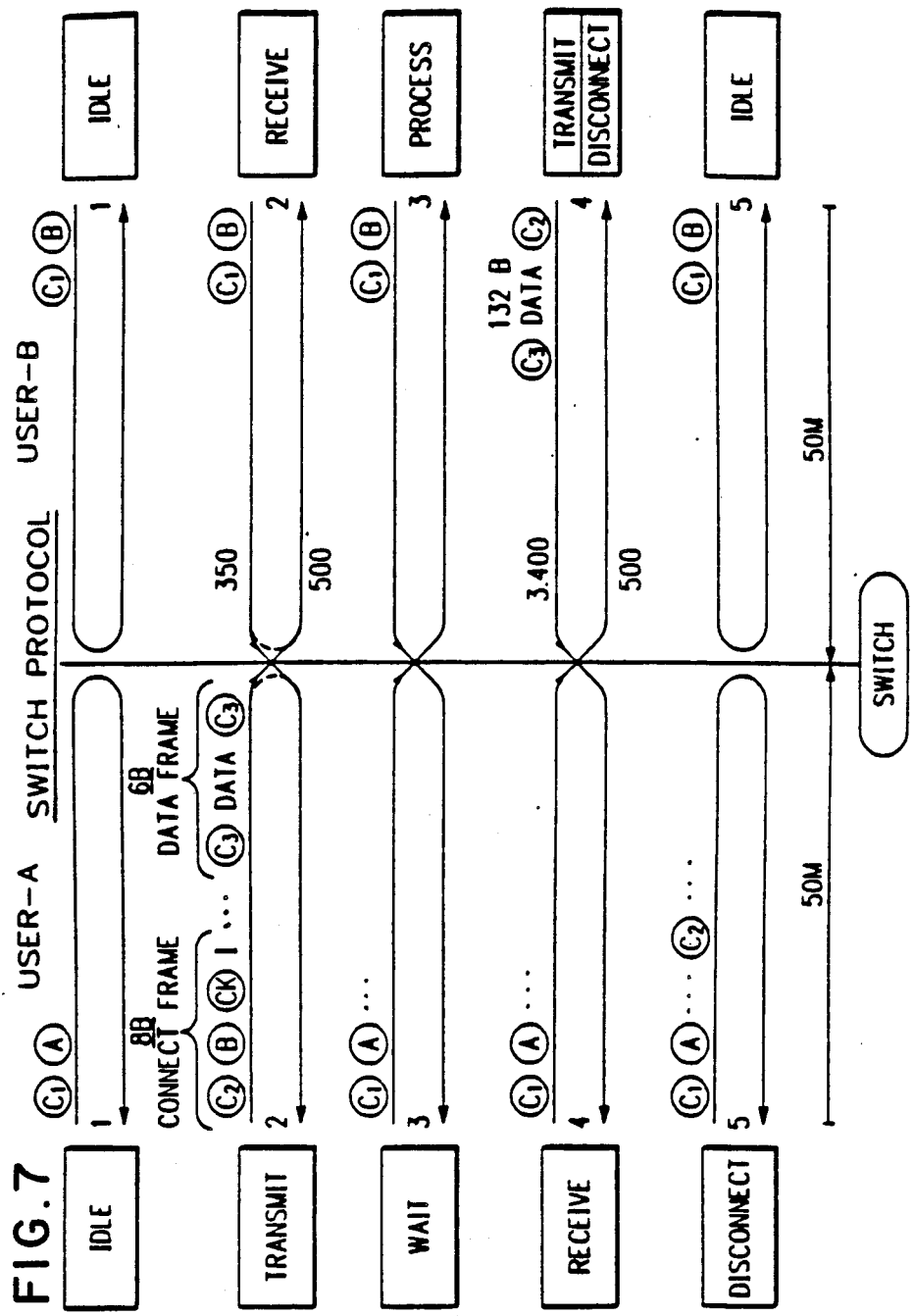
FIG. 7 is a timing diagram illustrating the request and response for the transfer of data.
Figure 8:
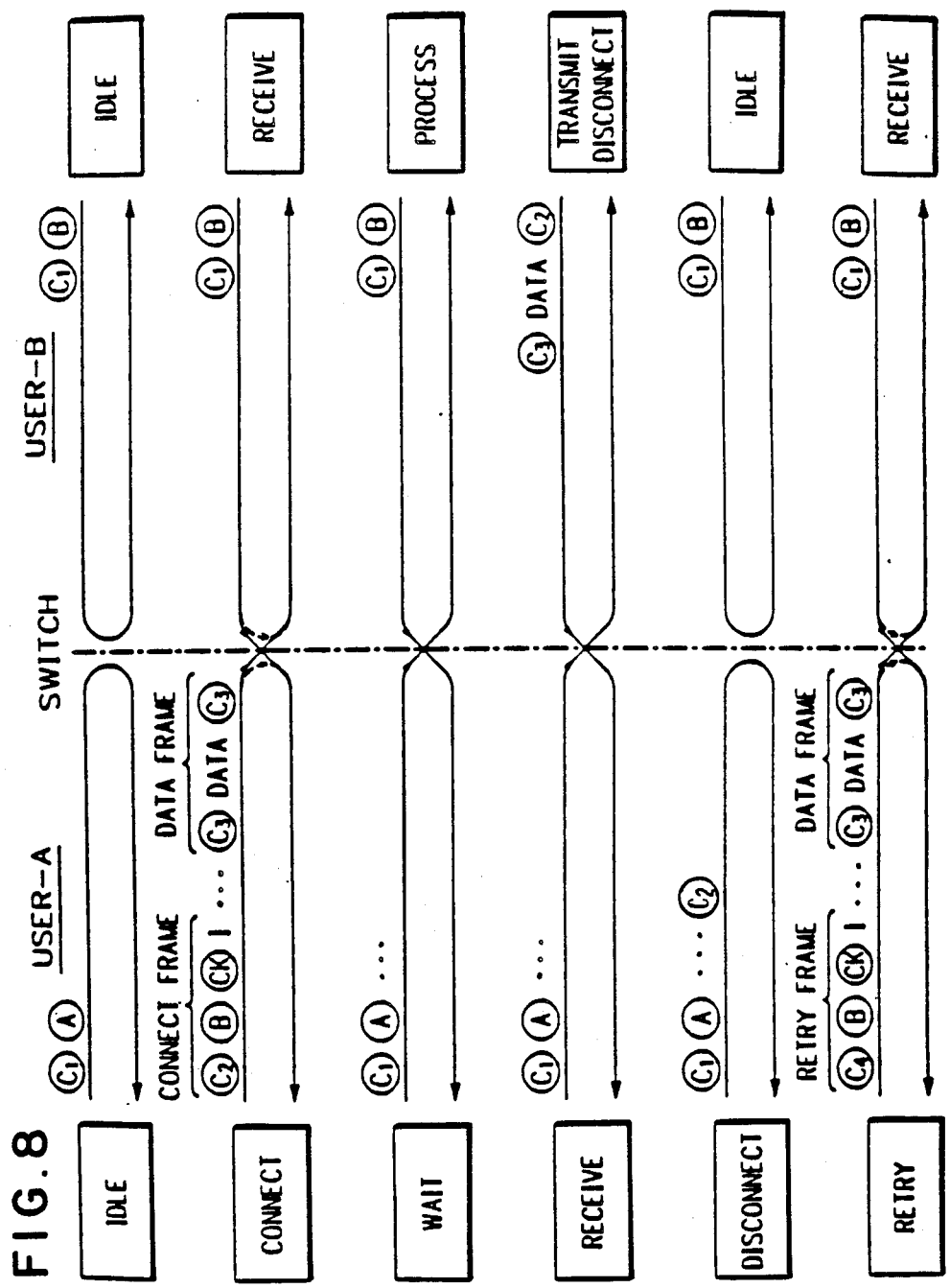
FIG. 8 is a timing diagram for the protocol of this invention.

The switching protocol assumes several limitations upon the structure of the central switch and the serial links 18–28. First of all, it is assumed that all data transfer is accomplished by a request/response sequence, that is, that one user requests another user to respond. Prior to the request, there is no connection between the user, and, after the response, the connection is broken. It is further assumed that each adaptor has two serial links to each of the switching planes, one for transmitting and one for receiving. These two links can be considered as a full-duplex link. It is further assumed that the adaptors are continuously broadcasting and receiving at some fixed repetition rate. This continuous broadcasting is illustrated in FIG. 8 for two users A and B connected through the switching system. If user A is not otherwise connected through the switch, the switch connects the input from the user A to the output back to user A. Similarly, the output from user B is connected to its own input if the two serial links are not otherwise used. In the idle mode, as illustrated in FIG. 8, both user A and user B are periodically transmitting a characteristic control word $C_1$ followed by the identification of the transmitting user. As explained later, the idle transmission can include a clock synchronization signal (010101 etc.) for achieving clock synchronization between two subsystems. Because the switch reflects these signals back to the transmitting user, after a progation time, both user A and user B receive their own idle transmissions.

If user A wishes to transmit a request to user B, user A transmits first an 8 byte data frame. The connect frame consists of the first byte $C_2$ indicating a request for a connection at the switch. The connect control character $C_2$ is followed by the identification B of the requested destination user. The connect frame finishes up with a clock synchronization sequence (010101 etc.) and then idle characters. The connect frame is equivalent to a CONNECT (A,B) command. Following the connect frame is a data frame containing data which is delimited at both the beginning and the end by delimiting characters $C_3$. The data in the data frame provides the information for the receiving user B to respond to.

The C. J. Georgiou patent application Ser. No. 554,653, filed Oct. 24, 1983, now U.S. Pat. No. 4,547,600, incorporated herein by reference, describes a very fast, pipelined marking and unmarking procedure. When a connection request is received by the cross-point switch, the request is queued for processing by the switch controller. The controller uses a first-come, first-served discipline. The controller of Georgiou's contains a port connection table with a busy bit associated with every meaningfully connected port. When a connection to a port is processed, its busy bit is queried. If the busy bit of B is 0, i.e. idle, the busy bits of A and B are set to 1 and then the request is successfully granted by marking the cross-points at both (A, B) and (B, A). It is believed that if the connection through the switch is available, it can be accomplished in 50 ns, allowing the following data frame to be transmitted through the switch to the receiving user B. If however the connection cannot be made, for example, because user B is busy and its busy bit is 1, no change in connection is made and the transmitting user A receives back its own connect and data frames. If the connection is successfully made, the transmitting user A receives instead the idle transmission $C_1B$ of the station to which it is transmitting, thus confirming the connection.

Once the receiving user B has received the request, it must spend some time processing this request. During the processing time, user B continues to broadcast its idle code $C_1B$ which is received by the originally requesting user A. A clock synchronization signal in the idle transmission would synchronize the clock of A with the clock of B. This user A is in a wait state awaiting the response and is also continuing to transmit its idle sequence of $C_1A$, which is transmitted to the other user B.

Once the user B has had sufficient time to process the request for data, it proceeds to transmit the data delimited on the forward end by a delimiter $C_3$ and delimited on the trailing by the control character $C_2$. Although the control character $C_2$ was previously used as a connect control character, it also indicates to an already connected cross-point that the cross-point is to be disconnected. The data is transmitted in the delimited packet and may be of substantial length, for instance 132 bytes. This data is the response to the original request and is received by the requesting user A. During the time of the data transmission, the user A continues to broadcast its idle sequence $C_1A$.

After the data packet has passed through the switch, the cross-point connecting user A to user B is disconnected. The user B then recommences sending its idle sequence $C_1B$ which is reflected back to user B by the switch. The user A, which has continued to transmit its idle sequence $C_1A$ during the data reception, sends out a disconnect control character $C_2$ to insure the disconnection at the switch. When the user A begins to receive its own idle code $C_1A$, it has confirmed that this disconnection at the cross-point switch has occurred. Either of the disconnect control sequences can be considered as the DISCONNECT (A,B) command.

The above protocol is really the protocol for a single plane. Similar commands must be simultaneously issued to all the planes and the above description assumes that all the connections and disconnections were in fact simultaneously performed on all the planes. However, as previously described, the situation can arise where a CONNECT (A,B) was successfully completed on one plane but was unsuccessful on another plane.

Figure 9:
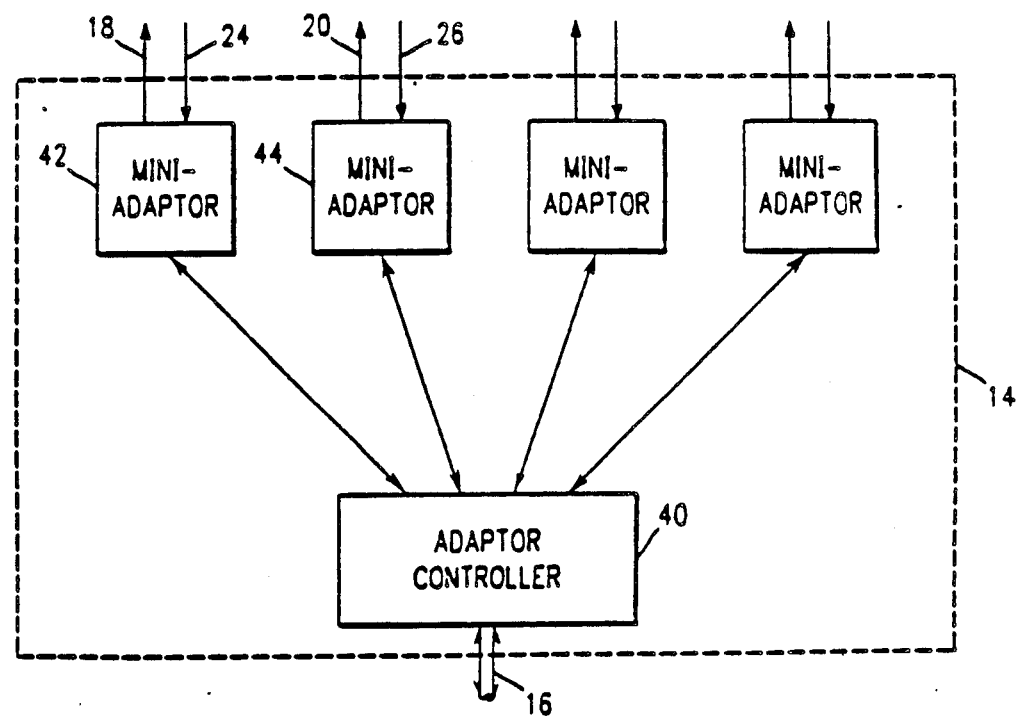
FIG. 9 is a block diagram of an adaptor for use with this invention.

The adaptor 14 is divided, as illustrated in FIG. 9, into an adaptor controller 40 and separate mini-adaptors 42 and 44. The adaptor controller 40 receives a message on the internal memory bus 16 and divides it between the mini-adaptors 42 and 44. Each mini-adaptor 42 or 44 sends its part of the divided message on the output link 18 or 20 and receives the divided message on the input link 24 or 26. Each mini-adaptor 42 or 46 is connected by the serial links to a separate autonomous cross-point switch. If g is greater than 1, there is a corresponding increase in the number of input and output links connected to each mini-adaptor. In order for the parallel communication paths to be set up through the central switch, each mini-adaptor 42 or 44 sends out the connection request on its output link 18 or 20. The protocol of FIG. 8 applies to each of the mini-adaptors 42 and 44. The protocol assures that the mini-adaptors are notified of the success or the lack of success for their respective request. This information is conveyed to the adaptor controller 40. After the adaptor controller 40 has caused the mini-adaptors to transmit the simultaneous connection requests to the individual autonomous planes, it waits a predetermined time T to receive confirmation of the n requests. If all n requests have been granted, the switch set-up is complete and processing continues. If none of the request have been granted, the adaptor waits for a random delay time $T_0$ to reinitiate the switch set-up, that is, to again cause all the miniadaptors 42 and 44 to issue their connect command. However, if after the predetermined time T only some of the end cross-point connections have been granted, then a contention resolution is required because some of the necessary paths have been blocked by a conflicting request from another adaptor.

The conflict can arise in a number of different ways. For example, if the central switch has received two nearly simultaneous commands CONNECT (A, B) and CONNECT (C, B), then the users A and C are both requesting access to the user B and each requires all n ports to user B. Because of the autonomous nature of the n cross-point switches, some of the ports were connected to user A and some to the user C and neither user A nor user C is successfully and completely connected. Another situation arises when the users A and B are nearly simultaneously requesting connection to each other, that is, the command CONNECT (A, B) overlaps the command CONNECT (B, A). The contention in this conflict is not for the cross-points or for the ports but rather for which of the two users A and B controls those cross-point switches or ports according to the protocol of FIG. 8. A third type of conflict arises when the user A is requesting a connection to the user B at the same time that the user B is requesting connection to a third user C, that is, the conflict between CONNECT (A, B) with CONNECT (B, C). There are more complex conflicts that may arise when more than two connection commands overlap, for example, the conflict among CONNECT (A, B), CONNECT (C, D) and CONNECT (B, C).

According to the invention, once the adaptor controller 40 has determined that a conflict exists, it follows a conflict protocol to cause the miniadaptors 42 which have not been successfully connected because of a conflict to issue RETRY commands in an effort to complete the full set of connections in the autonomous cross-point switches 30-34. The separate cross-point switches 30-34 receive the RETRY commands and, following the protocol, override a previously made connection or cross-point in order to grant at least one of the RETRY commands. The RETRY command differs from the CONNECT command in that the CONNECT (A, B) command is successfully executed only if the cross-point (A,B) is available.

In the previously described controller, this availability is indicated by the busy bit for B being 0. On the other hand, if the RETRY (A, B) is granted access by the conflict protocol, the connection between A and B is made despite the fact that the busy bit for B is 1, indicating that B is already busy. That is, the RETRY command can override an already existing connection.

Figure 11:
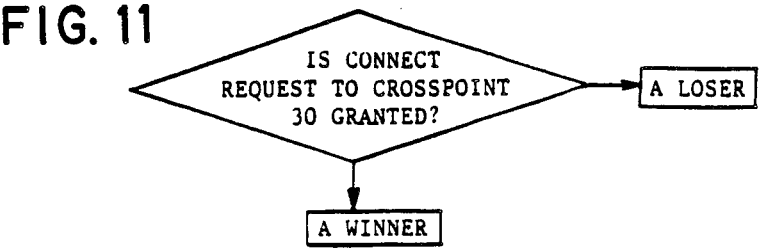
FIGS. 11 to 12 show alternate forms of one of the blocks of the flowchart of FIG. 10.

The conflict protocol can be implemented in at least three ways. In the first implementation, shown in FIG. 11, one of the switching planes or cross-point switches 30-34 is specified as determining the winner, for example, cross-point 30. The adaptor controller 40 determines if the CONNECT command issued to the specified cross-point switch 30 was successfully granted. If the CONNECT command to the specified cross-point 30 was granted, the adaptor controller 40 causes RETRY commands to be issued by all of its mini-adaptors 42 and 44 that have been unsuccessful because of conflict, that is, that have not been connected because of the conflict. If the CONNECT command to the specified cross-point switch 30 was not successfully granted, the adaptor controller 40 does not cause and RETRY commands to be issued. Thus one and only one adaptor 14 will issue RETRY commands.

According to this first way of implementing the conflict protocol, any cross-point switch 30-34 receiving a RETRY command honors the command and overrides any existing connections. As a result, the winning adaptor completes its connections through all the planes of the central switch 36 and the losing adaptors are disconnected by the RETRY commands of the winning adaptor.

Figure 12:
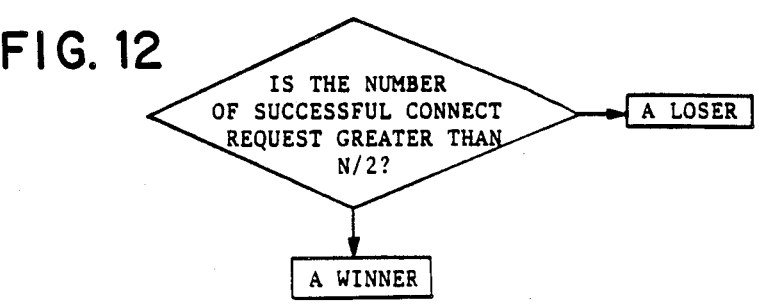

A second way of implementing the conflict protocol, shown in FIG. 12, is similar to the first implementation except that the winning adaptor is the one that has successfully been connected through more than half of the cross-point switches 30-34. The winning adaptor then issues the necessary RETRY commands to complete its own connections and to disconnect the losing adaptors. This way of implementing the conflict protocol, however, has the disadvantage that when two adaptors have each successfully made connections on exactly half of the cross-point switches, there is no defined winner. Furthermore, when there are three or more adaptors involved in the conflict, the possibility arises that no one adaptor has won a majority of connections. Accordingly, there is no clear winner according to the stated rule.

A conflict can possibly involve only a single CONNECT request. If a CONNECT request overlaps a DISCONNECT request that disconnects the ports requested by the CONNECT, connections may be successfully completed on only some of the planes, while the remaining planes become available somewhat later, but nonetheless too late. In this situation, as well as the situations described above, there may be no winner in the first two ways of implementing the conflict protocol. A method of escaping the no-winner situation is to have the losing adaptor monitor the connection clock signals on its successfully completed connections. If there is a winner, the connection clock signals will be terminated by the winner's RETRY command disconnecting the losing adaptor. However, if after the elapse of a time-out period after the start of the conflict, the connection clock signals continue, the losing adaptor sends DISCONNECT commands to the connected switching planes involved in the conflict to end the no-winner situation.

Figure 13:
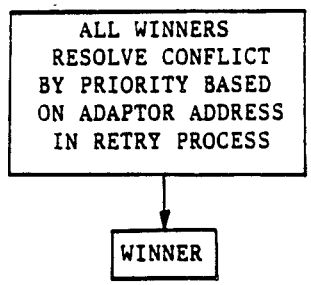

In the third implementation of the conflict protocol, shown in FIG. 13, the adaptor controller 40, upon detecting a conflict situation, causes all of its mini-adaptors 42 and 44 that have been unsuccessful because of conflict, that is, have not been connected because of conflict, to issue RETRY commands. Since at least two adaptors are in conflict (discounting the CONNECT-/DISCONNECT overlap situation), more than one set of RETRY commands will be issued by the various adaptors. No priorty is relied upon in issuing the RETRY commands. However, each adaptor is assigned an address and the addresses are arranged in a sequential priority scheme, e.g. A has priority over B and other lower priority adaptors, B has priority over C and other lower priority adaptors, etc.

The controllers on the autonomous switching planes are programmed with the address priority scheme. When the switching plane controller receives a RETRY request from an adaptor, it determines the priority of the requesting adaptor against the priority of the adaptor that caused the conflicting connection to be made. If the requesting adaptor has a higher priority, the RETRY request overrides the existing connection. If the requesting adaptor has a lower priority, the RETRY request is rejected by the switch. As a result the higher priority adaptor in conflict will complete the missing connections while the lower priority adaptor will lose its already existing connections by a higher priority RETRY. Eventually a complete set of connections are made.

For example, if CONNECT (A,B) and CONNECT (C,B) are in conflict, on some planes (A,B) are connected and in other planes (C,B) are connected. Both adaptors A and C issue RETRY requests for their missing planes. In this case, each plane receives one RETRY request. If the RETRY request is from A, and the port to B is requested by A but is currently held by C, the switch determines that A has a higher priority than C and so honors the RETRY (A,B) request. However the RETRY (C,B) request would be refused in view of the facts hat B is currently held by A and that A outranks C.

In utilizing this priority scheme, the priorities of the two adaptors involved in any connection must be distinguished. A source adaptor is the adaptor making a request for connection to a destination adaptor. The priority of the source adaptor making the RETRY request is compared with the priority of the source adaptor causing the conflict. Thus, if there is a conflict between CONNECT (B,C) and CONNECT (C,A), RETRY (B,C) will have priority over CONNECT (C,A) even though the destination adaptor A has priority over the successful source adaptor C. Similarly, RETRY (C,A) will not have priority over CONNECT (B,C). Also a conflict between CONNECT (A,B) and CONNECT (B,A) will be resolved in favor of RETRY (A,B) over the previously successful CONNECT (B,A). Conflicts involving more than two adaptors may require more than a single issuance of the RETRY request for a full resolution of the conflict.

The protocol shown in FIG. 8 provides that the CONNECT and RETRY commands are implemented as connect and retry frames that are immediately followed by data frames. As a result of the fast switching, data can be quickly transmitted through the switch. However in a conflict situation, parallel data frames may arrive at the destination adaptor from at least two source adaptors. Moreover as a result of the RETRY command, an additional data frame will be transmitted through the overridden cross-point. Thus the destination adaptor needs to have the means to recognize when it has received a complete set of data frames from a single source adaptor and furthermore must have the buffering capabilities to handle more than one data frame on a single input line before recombining one of those data frames with the proper parallel data frames. The source recognition could be based on the data frame containing a source identifier. Only when the destination adaptor has received parallel data frames from the same source adaptor would it consider the data to be received, that is, proceed to the merging of the data frames and processing that data.

Having thus described my, invention, when I claim, and desire to secure by Letter Patent is:

1. A switching method of establishing connections between users for a switching system that establishes multiple simultaneous comunications paths through multiple autonomous switching planes for a single transmission by a user issuing substantially simultaneous connection requests to each of said switching planes, comprising the steps of:
   determining which of said connection requests for multiple simultaneous communication paths have been successfully completed, with a conflict situation existing if one or more of said requests have been completed on one or more of said switching planes but not all of said requests have been completed on all of said multiple switching planes;
   issuing retry requests in a conflict situation to all planes on which said connection requests have not been completed, said retry requests being issued according to a conflict protocol, said determining and issuing steps being performed by a user that had issued said uncompleted connection requests; and
   honoring said retry requests according to said protocol, said honoring causing previously completed connections to be disconnected, said honoring being performed by the switching planes to which said retry requests had been issued.

2. A switching method as recited in claim 1, wherein according to said protocol:
   said determining step determines if a requested connection has been completed in a predetermined one of said switching planes, said predetermined switching plane being the same for all said users; and
   said issuing steps issues said retry requests only if said requesting connection from said user in said predetermined switching plane has been completed; and
   said honoring step honors all said retry requests.

3. A switching method as recited in claim 1, wherein according to said protocol:
   said determining steps determines if said requested connections have been made in a majority of said switching planes;
   said issuing steps issues said retry requests only if said majority of requested connections from said user have completed; and
   said honoring step honors all said retry requests.

4. A switching method as recited in claim 1, wherein according to said protocol:
   said issuing step issues said retry request to all said switching planes in which said requested connections have not been completed; and
   said honoring step honors said retry requests only from a first user having a higher priority than a second user issuing the connection request which prevented the completion of the connection request from said first user.

5. A switching method as recited in claim 2:
   wherein said determining step, after a time-out period following the determination of a conflict situation, determines which of said connection requests remain successfully completed, and if only some of said connection requests remain successfully completed, then a no-winner situation is existing; and
   further comprising the step of issuing disconnection commands in a no-winner situation to all planes on which said connection requests remain completed.

6. A switching method as recited in claim 3:

wherein said determining step, after a time-out period following the determination of a conflict situation, determines which of said connection requests remain successfully completed, and if only some of said connection requests remain successfully completed, then a no-winner situation is existing; and further comprising the step of issuing disconnection commands in a no-winner situation to all planes on which said connection requests remain completed.

7. A switching system for establishing multiple simultaneous communication paths between two of a plurality of users by connections through multiple switching planes for a single transmission by a user issuing substantially simultaneous connection requests to each of said switching planes, comprising:

multiple switching planes;

means for determining which of said connection requests for multiple simultaneous communication paths through said switching planes have been successfully completed, with a conflict situation existing if one or more of said requests have been completed on one or more of said switching planes but not all of said requests have been completed on all of said multiple switching planes;

means for issuing retry requests in a conflict situation to all planes on which said connection requests have not been completed, said retry requests being issued according to a conflict protocol, said determining means and said issuing means being controlled by a user that had controlled said issuing means to issue said uncompleted connection requests; and means for honoring said retry requests according to said protocol, said honoring means causing previously completed connections to be disconnected, said honoring means being associated with the switching planes to which said retry requests had been issued.

8. A switching system as recited in claim 7, wherein said switching planes are autonomous, and further comprising autonomous control means associated with each switching planes.

9. A switching system as recited in claim 8, wherein according to said protocol:

said determining means determines if said requested connections have been made in a majority of said switching planes;

said issuing means issues said retry requests only if said majority of requested connections from said user have completed; and said honoring means honors all said retry requests.

10. A switching method as recited in claim 9:

wherein said determining means, after a time-out period following the determination of a conflict situation, determines which of said connection requests remain successfully completed, and if only some of said connection requests remain successfully completed, then a no-winner situation is existing; and further comprising means for issuing disconnection commands in a no-winner situation to all planes on which said connection requests remain successfully completed.

11. A switching system as recited in claim 7, wherein according to said protocol:

said issuing means issues said retry request to all said switching planes in which said requested connections have not been completed; and said honoring means honors said retry requests only from a first user having a higher priority than a second user issuing the connection request which prevented the completion of the connection request from said first user.

12. A switching system as recited in claim 7, wherein according to said protocol:

said determining means determines if a requested connection has been completed in a predetermined one of said switching planes, said predetermined switching plane being the same for all said users; and said issuing means issues said retry requests only if said requested connection from said user in said predetermined switching plane has not been completed; and said honoring means honors all said retry requests.

13. A switching method as recited in claim 12:

wherein said determining means, after a time-out period following the determination of a conflict situation, determines which of said connection requests remain succesfully completed, and if only some of said connection requests remain successfully completed, then a no-winner situation is existing; and further comprising means for issuing disconnection commands in a no-winner situation to all planes on which said connection requests remain successfully completed.

* * * * *